(12) United States Patent
Izquierdo Gil (10) Patent No.: US 11,084,598 B2
(45) Date of Patent: Aug. 10, 2021

(54) POWER DISTRIBUTION SYSTEM FOR DC NETWORK

(71) Applicant: Airbus Defence and Space, S.A.U., Getafe (ES)

(72) Inventor: Daniel Izquierdo Gil, Getafe (ES)

(73) Assignee: AIRBUS DEFENCE AND SPACE, S.A.U., Getafe (ES)

( * ) Notice: Subject to any disclaimer, the term of this patent is extended or adjusted under 35 U.S.C. 154(b) by 233 days.

(21) Appl. No.: 16/133,066

(22) Filed: Sep. 17, 2018

(65) Prior Publication Data
US 2019/0118960 A1    Apr. 25, 2019

(30) Foreign Application Priority Data

Sep. 15, 2017   (EP) .................................. 17382612

(51) Int. Cl.
| | |
|---|---|
| *B64D 31/00* | (2006.01) |
| *H02J 1/10* | (2006.01) |
| *B64C 1/36* | (2006.01) |
| *H02J 3/00* | (2006.01) |
| *B64D 27/02* | (2006.01) |

(Continued)

(52) U.S. Cl.
CPC ............... *B64D 31/00* (2013.01); *B64C 1/36* (2013.01); *B64D 27/02* (2013.01); *H02J 1/102* (2013.01); *H02J 1/14* (2013.01); *H02J 3/0073* (2020.01); *H02J 3/38* (2013.01); *H02J 4/00* (2013.01); *B64D 2221/00* (2013.01)

(58) Field of Classification Search
CPC .... B64D 31/00; B64D 27/02; B64D 2221/00; H02J 3/0073; H02J 1/102; H02J 1/14; H02J 3/38; H02J 4/00; H02J 2310/44; B64C 1/36
See application file for complete search history.

(56) References Cited

U.S. PATENT DOCUMENTS

2002/0175567 A1   11/2002   Marin-Martinod
2005/0177756 A1    8/2005   Dobbs et al.
(Continued)

FOREIGN PATENT DOCUMENTS

EP   0150853 A2   8/1985
EP   0685917 A1   6/1995

OTHER PUBLICATIONS

European Search Report; priority document.

*Primary Examiner* — Daniel Cavallari
(74) *Attorney, Agent, or Firm* — Greer, Burns & Crain, Ltd.

(57) ABSTRACT

A power distribution system for a DC network, the DC network comprising electrical loads, the power distribution system being boarded on an aircraft and comprising: a plurality of AC/DC converters, and at least one AC power source. The power distribution system comprises: an "n" number of AC/DC converters, each one comprising an "(n−1)" number of first outputs and at least an additional output, and an "(n−1)·n" number of electrical loads. Each electrical load comprises two inputs: a first input for being connected with a corresponding first output, and a second input for being connected with any of the additional outputs. The power distribution system is configured to continue supplying electrical power to the DC network in case an AC/DC converter is not energized, such that the second input of such electrical load is connected to any additional output of another AC/DC converter, being the first input disconnected.

13 Claims, 10 Drawing Sheets

(51) Int. Cl.
*H02J 1/14* (2006.01)
*H02J 3/38* (2006.01)
*H02J 4/00* (2006.01)

(56) References Cited

U.S. PATENT DOCUMENTS

2008/0100136 A1 5/2008 Langlois et al.
2010/0156187 A1 6/2010 Pines
2013/0293012 A1 11/2013 Song et al.

POWER DISTRIBUTION SYSTEM FOR DC NETWORK

CROSS-REFERENCES TO RELATED APPLICATIONS

This application claims the benefit of the European patent application No. 17382612.4 filed on Sep. 15, 2017, the entire disclosures of which are incorporated herein by way of reference.

TECHNICAL FIELD OF THE INVENTION

The present invention belongs to the field of power distribution, in particular to the field of fail-safe reconfigurations using electronics architecture in the event of failure detected in power sources. More specifically, the invention is of special application in the aeronautic industry for powering electrical equipment such as electrical engines, radar antennas or any other DC (Direct Current) network boarded within the aircraft.

BACKGROUND OF THE INVENTION

An Airborne Warning and Control System (also known as AWACS) is an airborne radar antenna picket system boarded in an aircraft and configured to detect objects in the vicinity. Such a radar antenna system is an additional electrical system, in the form of a DC network, normally incorporated into a conventional aircraft architecture which further requires an increment of power generation.

This increment of power generation required should be enough as to supply electrical power to such an additional electrical system, a so-called DC network, incorporated in the conventional configuration of the aircraft.

In this sense, the electrical power that the aircraft should provide is substantially doubled, up to an additional 400 kW. Moreover, the power should be supplied, at least as 270V Direct Current (DC), while the conventional configuration of the aircraft's electrical grid is around 28V (DC). All this leads to a major adaptation of the aircraft architecture.

In ordinary radar electrical architecture, the radar antenna comprises a plurality of electrical loads gathered into four discrete load modules, each being fed by an autonomous AC power source. These AC power sources are connected somehow to AC/DC converters, i.e., electronic devices for converting electrical power from Alternating Current (AC) to Direct Current (DC) which afterwards feeds the electrical loads of the radar antenna.

During operation, i.e., in normal mode, the total minimum electrical requirement of power supplied to the electrical loads is 350 kW. However, with the failure of any of the AC power sources during operation, the AWACS electrical architecture switches to a degraded mode, being the total minimum electrical requirement of power supplied to all the electrical loads reduced up to 260 kW. Therefore, a set of downstream electrical loads of the AC power sources failed are affected by being not fed. Nevertheless, even those electrical loads affected must be fed somehow to keep the equipment services of the radar antenna still working during the mission.

Furthermore, in this degraded mode, an AC/DC converter is not energized and therefore neither are its downstream electrical loads of the radar antenna. However, the conventional solutions known in the prior art rely on providing an additional AC power to supply or feed the electrical loads affected. Additionally, this solution provides oversizing AC/DC converters, paralleling them to redistribute the electrical power to all the loads.

Also, the providing of additional AC power may be both in terms of adding a new AC power source and/or oversizing the current ones which would require providing more than 166 kW of mechanical power in order to fulfill with degraded mode conditions. This amount is much higher than that required in normal mode, thus increasing fuel consumption, and increasing weight and volume of the AC power sources.

This abovementioned oversizing of the AC/DC converters poses some problems as, for example, increasing the weight and volume of the AC/DC converters. Additionally, since the radar antenna requires a substantial high power level, the solution of paralleling the AC/DC converters energized to feed the electrical loads affected is a complex and risky solution that may produce unexpected and collateral drawbacks due to the high power level handled by the components.

SUMMARY OF THE INVENTION

The present invention provides a solution for the aforementioned problems.

In a first inventive aspect, the invention provides a power distribution system for a Direct Current (DC) network such as a radar antenna, wherein the DC network comprises a plurality of electrical loads, and the power distribution system being preferably boarded on an aircraft and comprising:

a plurality of AC/DC converters for supplying electrical power to the DC network, and at least one Alternating Current power source for energizing the AC/DC converters, wherein the power distribution system comprises, an "n" number of AC/DC converters, comprising each one "(n−1)" number of first outputs and at least an additional output, an "(n−1)·n" number of electrical loads, each "(n−1)" electrical load corresponding to one AC/DC converter, wherein each electrical load comprises two inputs:

a first input for being connected with a corresponding first output of the corresponding AC/DC converter, and a second input for being connected with any of the additional outputs of the AC/DC converters, wherein the power distribution system is configured to continue supplying electrical power to the DC network in case of an AC/DC converter is not energized and therefore not supplying electrical power to its corresponding electrical loads, such that the second input of such electrical loads is connected to any additional output of another AC/DC converter, being the first inputs disconnected.

Throughout this entire document, a DC network according to the invention may also be an anti-pollution system, electrical engines, an electrical system measurement (ESM), or the like.

Throughout this entire document, "n" will be understood as an integer, i.e. a number without a fractional component.

According to the invention, an "(n−1)" number of electrical loads are configured to be fed with DC electrical power by a single AC/DC converter. In other words, the lay-out of the electronic architecture is intended to connect the first input of each "(n−1)" electrical loads with one of the "(n−1)" outputs of the corresponding AC/DC converter in the normal mode and, therefore, the correspondence of an "(n−1)" number of electrical loads is to one AC/DC converter.

Advantageously, this power distribution system avoids paralleling the AC/DC converters which is a complex and risky solution at the power level required by the DC network. For instance, for a radar antenna, the power level required is normally within the range of 260-350 kW.

According to the invention, the power distribution system is configured to continue supplying electrical power to the DC network in case of an AC/DC converter is not energized. This scenario is known as degraded mode, being produced upon the failure of any of the upstream AC power sources feeding the AC/DC converter.

In this sense, the power distribution system according to the invention provides power redistribution among the electrical loads in a degraded mode. This power redistribution is achieved by power support of the energized AC/DC converters to the corresponding loads of the not energized AC/DC converter. Hence, the additional power needed to offset the not energized AC/DC converter is distributed by the energized AC/DC converters, therefore each one handling less power and avoiding oversizing their upstream AC power sources.

In a preferred embodiment, the DC network is a radar antenna. More preferably, the DC network is an Airborne Warning and Control System, i.e. an airborne radar antenna picket system boarded in an aircraft and configured to detect objects in the vicinity.

In a preferred embodiment, the AC/DC converters are High Voltage-Transformer Rectifier Units (the so-called HV-TRU). The High Voltage-Transformer Rectifier Units comprises multiple outputs, which permits providing power to the electrical loads of an AC/DC converter not energized.

In a particular embodiment, the at least one AC power source comprises two reciprocating engines, preferably two diesel engines, each one energizing two 115 VAC or 230 VAC generators which are configured to further each energize an AC/DC converter.

In this embodiment, the AC power sources failed in the degraded mode may be either any of the reciprocating engines or any of the four generators each feeding an AC/DC converter.

Preferably, the 115 VAC or 230 VAC generators are directly connected to the gearbox of the reciprocating engines and therefore operate at a variable frequency proportional to the engine speed. Advantageously, 115 VAC or 230 VAC are the two standard voltage levels normally used in aircraft electrical architecture.

In a particular embodiment, the at least one AC power source comprises four reciprocating engines, preferably four diesel engines, each one energizing a 115 VAC or 230 VAC generator, each configured to further energize an AC/DC converter.

In a preferred embodiment, the "n" number of AC/DC converters is four. Therefore, the system comprises four AC/DC converters and three electrical loads connected to each.

In a preferred embodiment, the power distribution system comprises "n" number of AC/DC converters, each comprising three additional outputs.

In a particular embodiment, each of the "(n−1)" electrical loads corresponding to one AC/DC converter is connected in an array.

In a particular embodiment, each array connecting the "(n−1)" electrical loads in parallel is supplied:
with 87.5 kW if all the AC/DC converters (3) are energized; or
with 65 kW if any of the AC/DC converters (3) is not energized.

Advantageously, this allows meeting the total minimum electrical requirement of power supplied to the electrical loads, preferably being 350 kW in normal mode and 260 kW in degraded mode.

In a particular embodiment, the "(n−1)·n" electrical loads operate at least at 270V Direct Current (DC).

In a particular embodiment, the power distribution system further comprises, switching means for switching connections in case of an AC/DC converter is not energized, and an electronic controller configured to activate/deactivate the switching means.

In a preferred embodiment, the switching means are contactors, automatisms, circuit breakers, relays, or the like. More preferably, the switching means are contactors.

In a particular embodiment, the DC network, such as a radar antenna, comprising a plurality of electrical loads is housed in a weatherproof dome in the top of the aircraft.

In a second inventive aspect, the invention provides a method for continuing supplying electrical power in a power distribution system for a DC network, such as a radar antenna, wherein the DC network comprises a plurality of electrical loads, and the power distribution system being preferably boarded on an aircraft and comprising:
a plurality of AC/DC converters for supplying electrical power to the DC network, and
at least one AC power source for energizing the AC/DC converters,
wherein the power distribution system comprises,
an "n" number of AC/DC converters, each one comprising an "(n−1)" number of first outputs and at least an additional output,
an "(n−1)·n" number of electrical loads, each "(n−1)" electrical load corresponding to one AC/DC converter, wherein each electrical load comprises two inputs:
a first input connected with a corresponding first output of the corresponding AC/DC converter, and
a second input for being connected with any of the additional outputs of the AC/DC converters,
wherein when one of the AC/DC converter is not energized, the method comprises the steps of:
disconnecting the first outputs of the AC/DC converter not energized, being its corresponding "(n−1)" electrical load not energized thereby; and
connecting the second input of each of the corresponding "(n−1)" electrical loads to an additional output of another AC/DC converter energized.

In a third inventive aspect, the invention provides an aircraft comprising the power distribution system according to any of the embodiments of the first inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Ordinary Radar Electrical Architecture (Radar DC Network)

Firstly, it is to be noted that for illustrative purposes, only a radar electrical architecture, or radar DC network, will be described hereafter. Nevertheless, the DC network according to the invention may be also an anti-pollution system, electrical engines, an electrical system measurement (ESM), or the like. Therefore, the same electrical architecture or DC network described hereafter will also applies to the mentioned systems, indiscriminately.

Figure 1A:
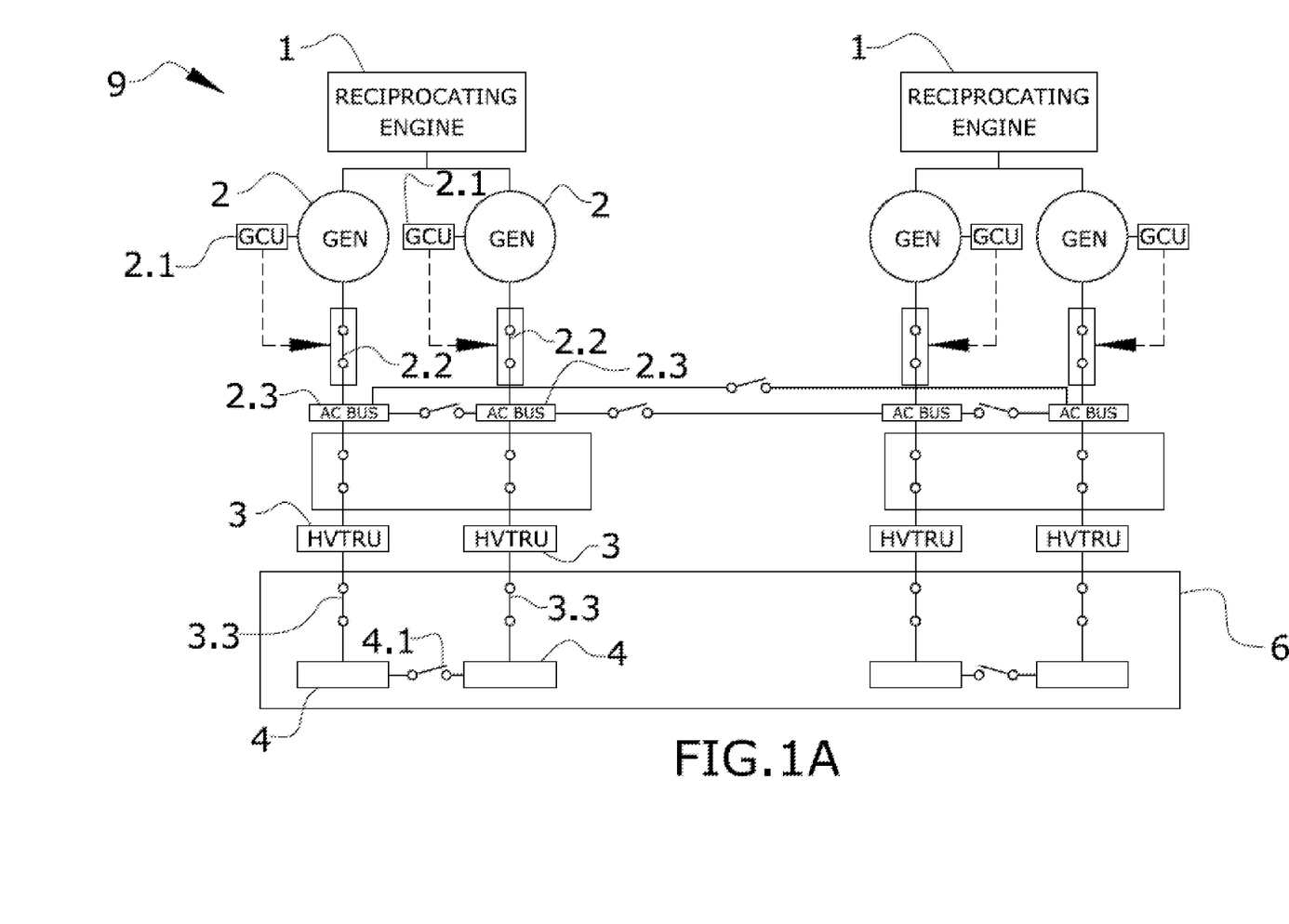
FIGS. 1a-1b show schematic ordinary DC network in a normal mode.

FIG. 1a shows a schematic ordinary radar electrical architecture, radar DC network, in a normal mode. As it was already mentioned, this mode takes place during aircraft operation, where all the components are full-operative, and the total minimum electrical requirement of power supplied is 350 kW.

The electrical architecture shown in this figure comprises two reciprocating engines (1) for producing mechanical power, which preferably are Auxiliary Power Units (APUs) such as diesel engines. Then, the reciprocating engines (1) comprise gearboxes to directly connect each to two 115 VAC or 230 VAC generators (2) and convert the mechanical power into Alternating Current (AC) electrical power. Therefore, both the reciprocating engines (1) and the generators (2) will be understood as AC power sources.

Additionally, each generator (2) comprises a Generator Control Unit (GCU) (2.1) for supervising its associated downstream AC generating channel by a mechanism for switching, by both removing or restoring the conducting path in a contactor (2.2) or switching means of the circuit.

Throughout this entire document, a contactor will be understood as a switching means or an electrical component that can "make" or "break" an electrical circuit, interrupting the current (either AC or DC) or diverting it from one conductor to another Similar terms may be automatisms, circuit breakers, relays, or the like.

After each contactor (2.2) or switching means of the generators (2), there is an AC bus (2.3) each of which is connected both with its paired AC bus (2.3) coming from the same reciprocating engine (1), and with another AC bus (2.3) coming from the other reciprocating engine (1). The connection between AC buses (2.3) is through switching means for paralleling them in the event of an upstream failure.

As can be seen in FIG. 1a, each AC bus (2.3) is connected to an AC/DC converter (3); therefore each AC bus (2.3) works as a connection point between an AC/DC converter (3) and the AC power sources for energizing the AC/DC converter (3).

Then, these AC/DC converters (3) feed a radar antenna (6) which further comprises a plurality of electrical loads (5) gathered into four discrete arrays (4) or DC buses. Therefore, each array (4) is fed by a single AC/DC converter (3) by an AC/DC contactor (3.3). In addition, the arrays (4) or DC buses comprise a switching means (4.1) connecting the arrays (4) paired, that is to say, those coming from the same reciprocating engine (1).

Figure 1B:
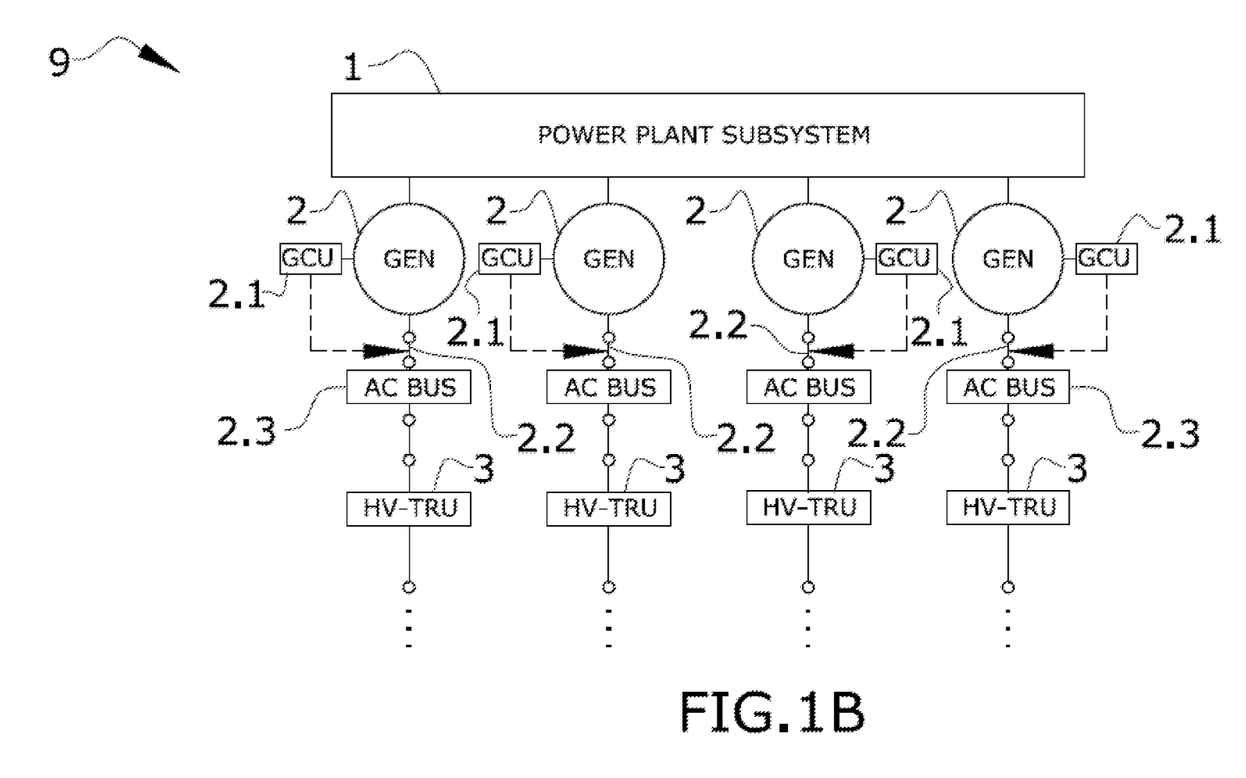

FIG. 1b schematically shows a particular embodiment of the ordinary radar electrical architecture in a normal mode. The electrical architecture shown in this figure comprises a power plant subsystem, preferably formed by four reciprocating engines (1) for producing mechanical power, which preferably are Auxiliary Power Units (APUs) such as diesel engines. Then, the power plant subsystem is directly connected to four 115 VAC or 230 VAC generators (2). Preferably, each one of the four reciprocating engines (1) of the power plant subsystem comprises a gearbox to directly connect one generator (2) to each reciprocating engine. Therefore, both the reciprocating engines (1) and the generators (2) will be understood as AC power sources.

Figure 2A:
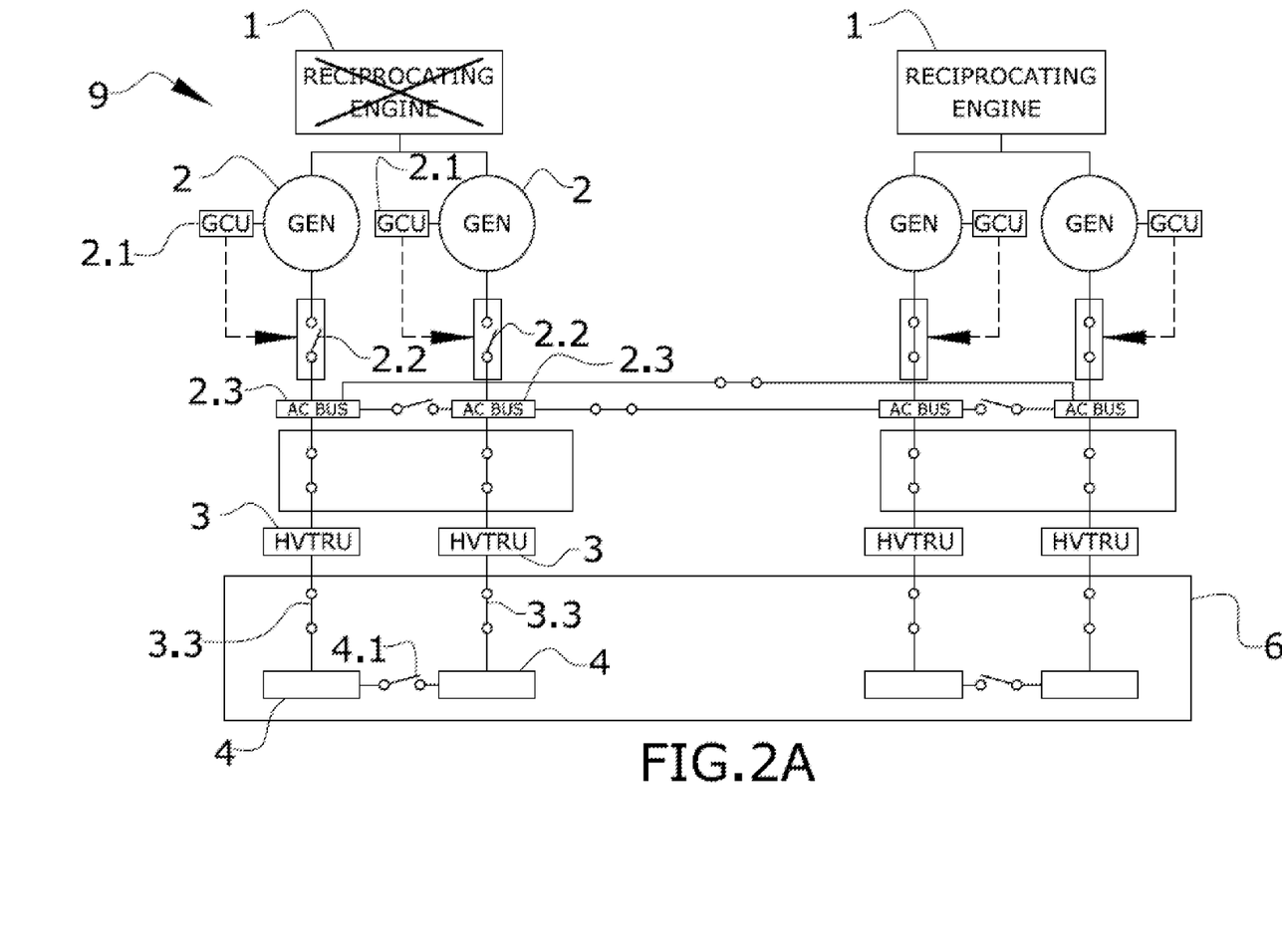
FIGS. 2a-2c show a schematic ordinary DC network in degraded modes.
Figure 2B:
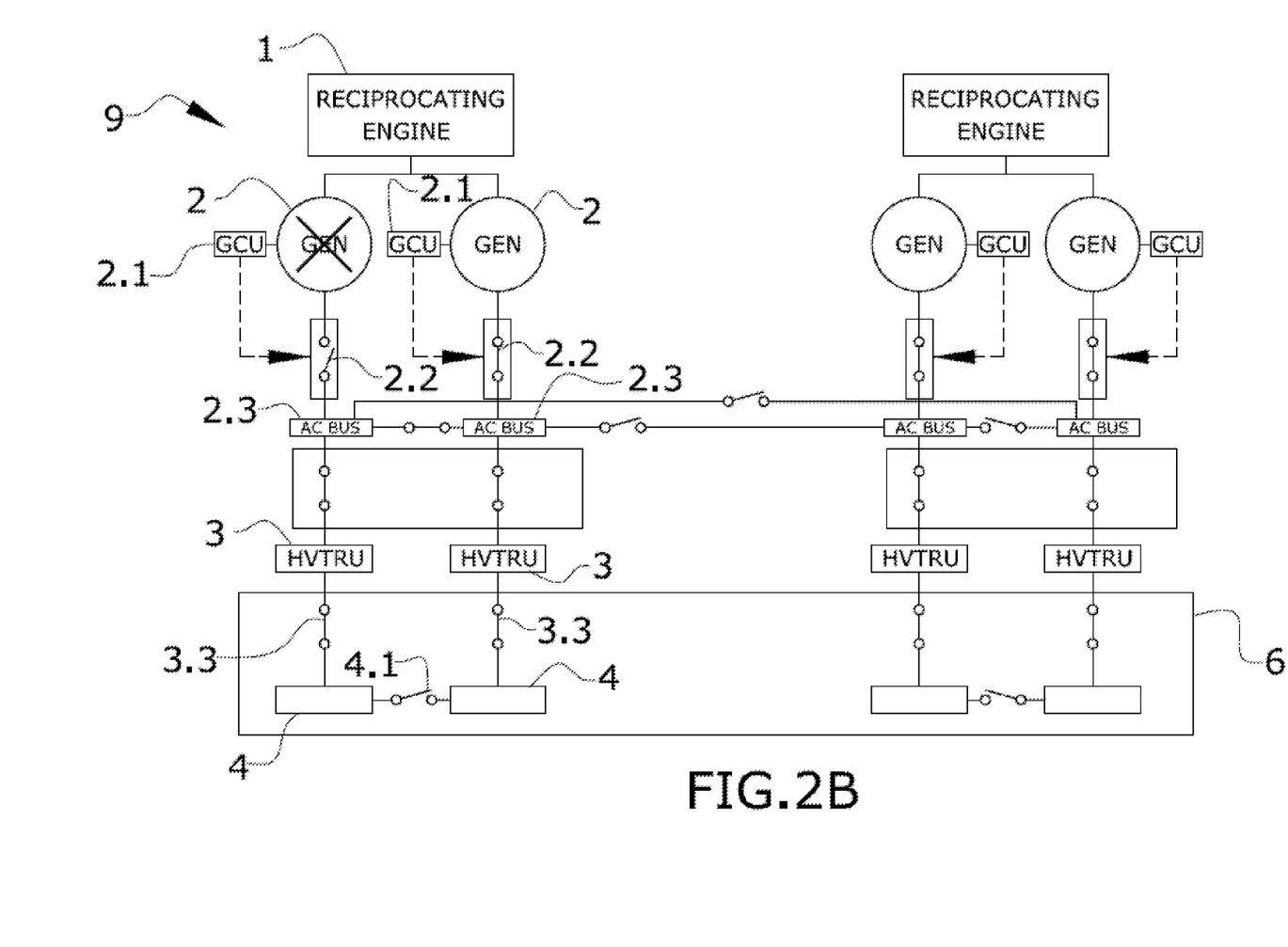
Figure 2C:
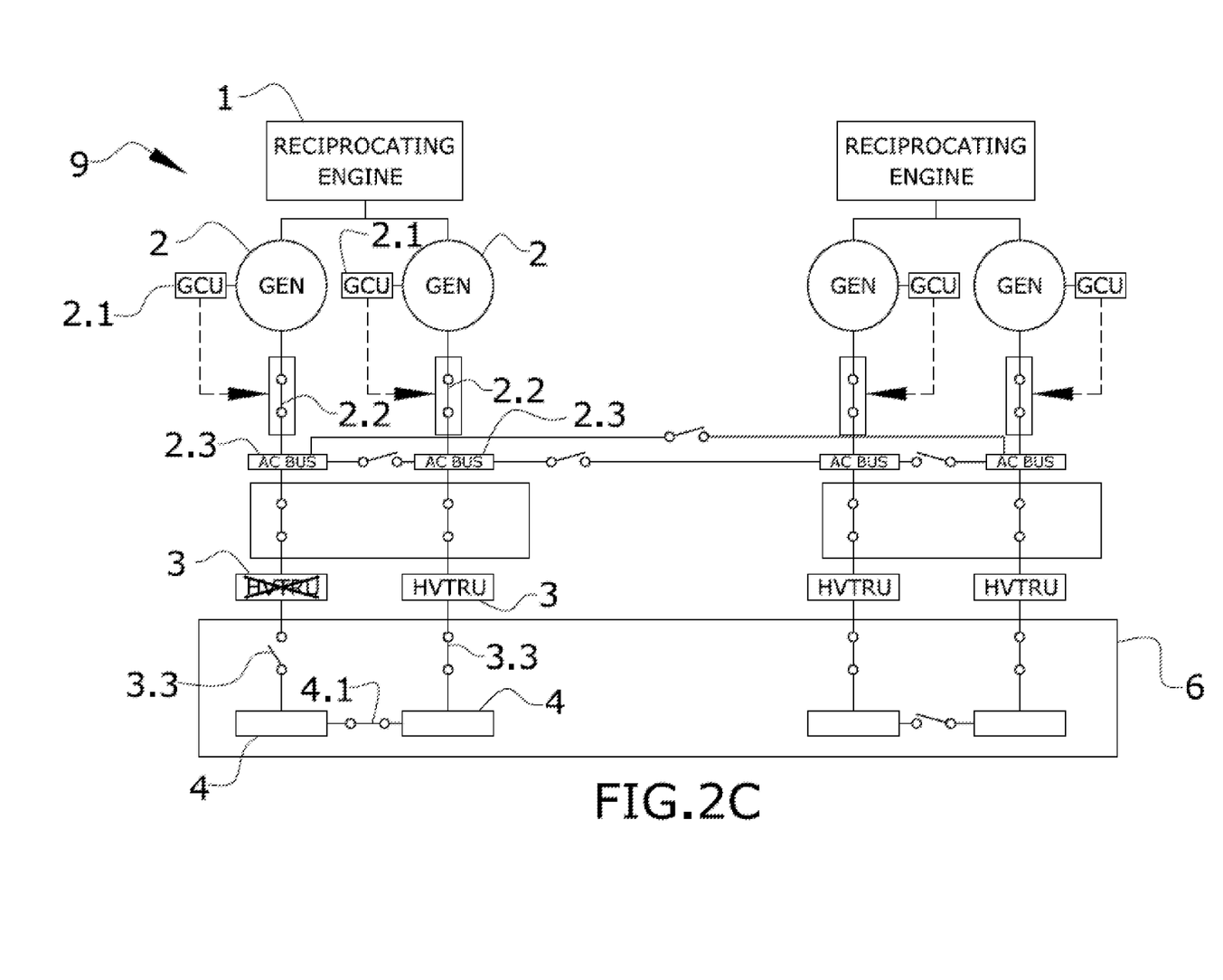

Now that the ordinary radar electrical architecture has been explained in the normal mode, FIGS. 2a-2c show examples of degraded modes in the electrical architecture, also known as a DC network, of FIG. 1a.

FIG. 2a shows the configuration of the electrical architecture if one reciprocating engine (1) has failed. In this situation, the contactors (2.2) of the generator (2) affected by the failed reciprocating engine (1) are opened in order to remove the conducting path.

To solve the continuing supply of power to all the arrays (4) of the radar antenna (6), the AC buses (2.3) affected are connected in parallel with their non-paired AC buses (2.3), i.e. with the AC buses (2.3) coming from the operative reciprocating engine (1).

FIG. 2b shows the configuration of the electrical architecture if one generator (2) has failed. In this situation, the contactor (2.2) of the generator (2) failed is opened in order to remove its conducting path.

To solve the continuing supply of power, the AC bus (2.3) affected is connected in parallel with its paired AC bus (2.3).

FIG. 2c shows the configuration of the electrical architecture if one AC/DC converter (3) has failed. In this situation, its AC/DC converter contactor (3.3) is opened in order to remove its conducting path towards the array (4).

To solve the continuing supply of power, the array (4) affected is connected in parallel with its paired array (4).

For illustrative purposes, only a limited number of references have been shown in the figures. Nevertheless, it can be easily deduced which reference corresponds to the features shown in the figures.

Power distribution system (10) for a radar antenna (6)

Figure 3:
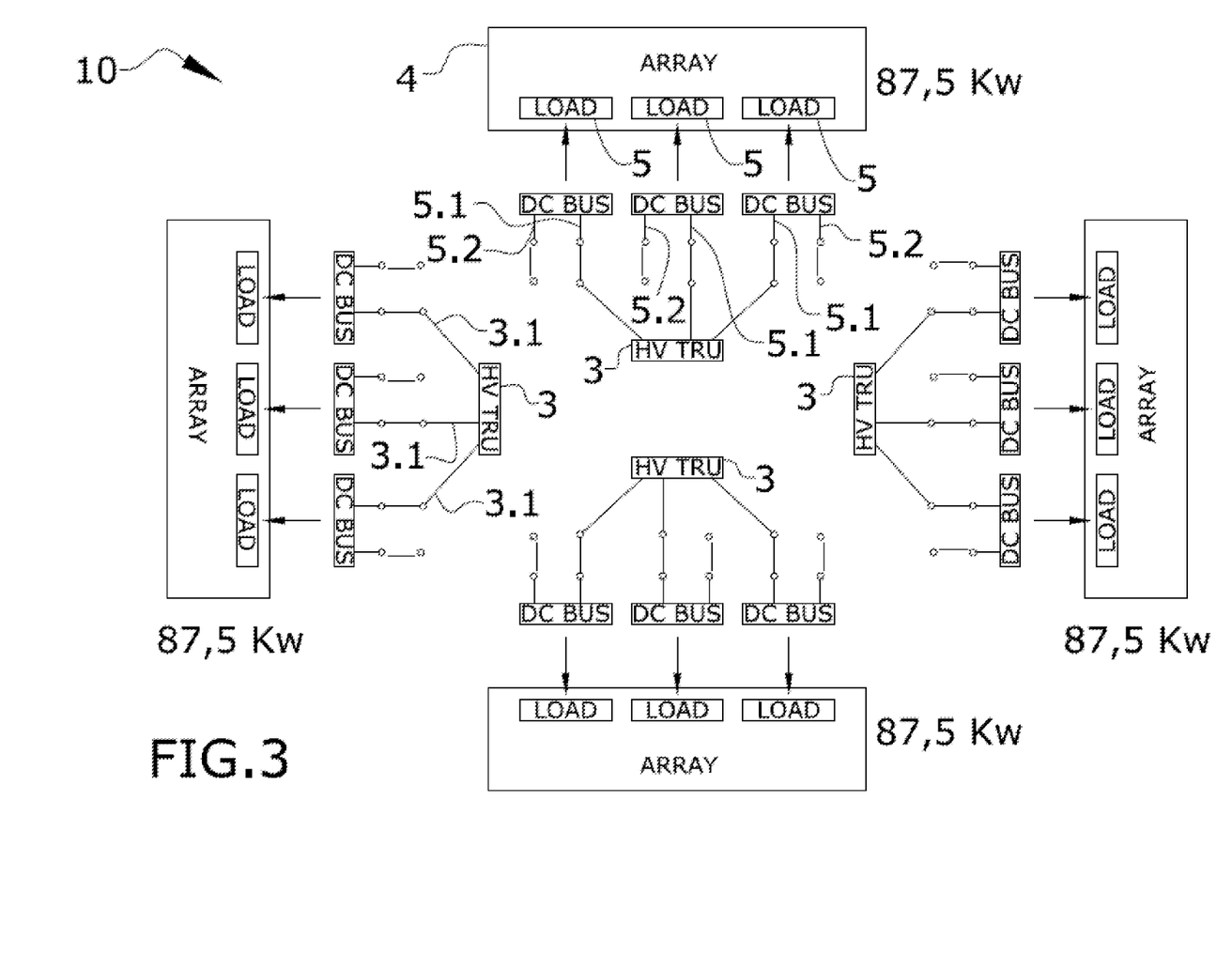
FIG. 3 shows a schematic power distribution system for a radar antenna according to the invention in a normal mode.

FIG. 3 shows a schematic power distribution system (10) for a radar antenna according to the invention in a normal mode. As it can be seen, FIG. 3 only shows the electrical architecture from the AC/DC converters (3), while the previous architecture, in a particular embodiment, is the same as that shown in FIG. 1a. In another particular embodiment, the electrical architecture from the AC/DC converters (3) is the same as that shown in FIG. 1b.

According to the invention, the power distribution system (10) for a radar antenna (6) comprises:

a plurality of AC/DC converters (3) for supplying electrical power to the electrical loads (5) of the radar antenna (6) gathered in arrays (4), and at least one AC power source (1, 2) for energizing the AC/DC converters (3) (not shown in this figure).

Also, as it can be seen in FIG. 3, the power distribution system (10) comprises:

an "n" number of AC/DC converters (3) being in this particular example "4", comprising each one an "(n−1)" number of first outputs (3.1) and at least an additional output (3.2), and an "(n−1)·n" number of electrical loads (5) being in this particular example "12", each "(n−1)" electrical loads (5) corresponding to one AC/DC converter (3).

Besides, each electrical load (5), or DC bus connected to, comprises two inputs:

a first input (5.1) connected with a corresponding first output (3.1) of the corresponding AC/DC converter (3); and a second input (5.2) disconnected.

In this normal mode, each array (4) is energized with 87.5 kW and, because of the power distribution system comprises four arrays (4), 87.5 kW·4arrays=350 kW which is the total minimum electrical requirement of power supplied in normal mode.

Preferably, the connection between the AC/DC converter (3) and its corresponding electrical loads (5) is through a DC bus which comprises the first (5.1) and second (5.2) inputs. Then, the AC/DC converters (3) being connected directly to their corresponding electrical loads (5), or by DC buses will be understood as a similar configuration.

Unlike the ordinary radar electrical architecture; the electrical loads (5) are not intended to be connected in parallel as prior art does by the switching means (4.1) between paired arrays.

Figure 4A:
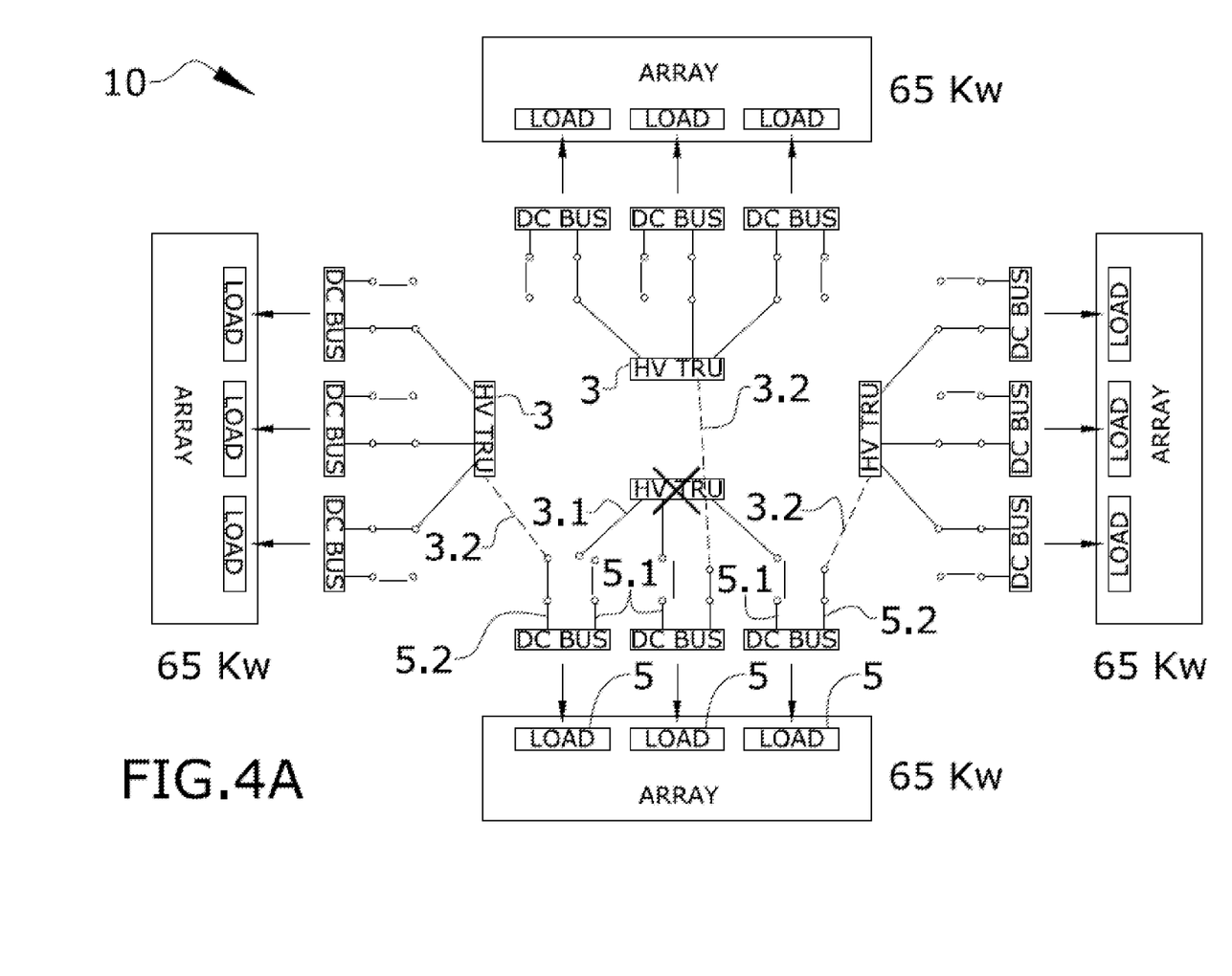
FIGS. 4a-4b show a schematic power distribution system for a radar antenna according to the invention in a degraded mode.
Figure 4B:
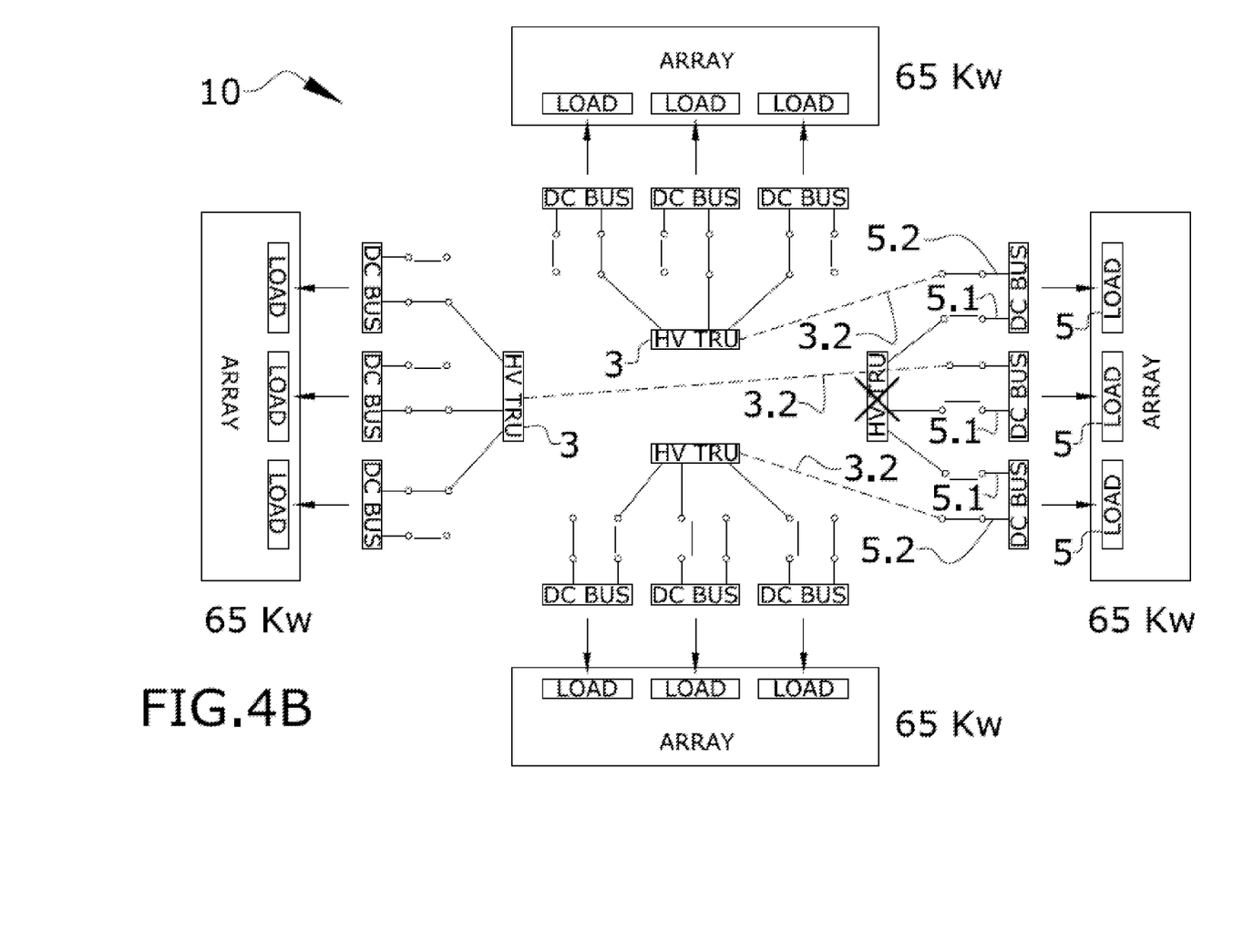

FIGS. 4a and 4b show different configurations of the electrical architecture in the event one AC/DC converter (3) has failed, the system being in a degraded mode.

In this situation, to solve the continuing of power suppling, the two inputs of the corresponding or affected electrical loads (5) of the AC/DC converter (3) failed, are positioned as follows:

the first input (5.1) disconnected; and a second input (5.2) connected with any of the additional outputs (3.2) of the AC/DC converters (3).

As it can be seen, the electrical loads (5) of the AC/DC converter (3) not failed are fed or energized maintaining the configuration shown in FIG. 3, i.e., normal mode. However, the AC/DC converters (3) not failed each use their additional output (3.2) to support, in terms of electrical power, a particular electrical load (5) of the failed AC/DC converter (3).

In other words, the power distribution system is configured to continue supplying electrical power to the radar antenna in case of an AC/DC converter (3) is not energized and therefore not supplying electrical power to its corresponding electrical loads (5), such that the second input (5.2) of such electrical load (5) is connected to any additional output (3.2) of another AC/DC converter (3), being the first input (5.1) disconnected.

In this degraded mode, each array (4) is energized with 65 kW because the AC/DC converters are still fed with 87.5 kW, but they need to distribute among 4 electrical loads (5) instead of just their corresponding 3. Hence, 87.5 kW/4 electrical loads≈21.6 kW and as each array is made of 3 electrical loads (5), each array (4) is energized with 65 kW. Then, 65 kW·4 arrays=260 kW which is the total minimum electrical requirement of power supplied in degraded mode.

Figure 4C:
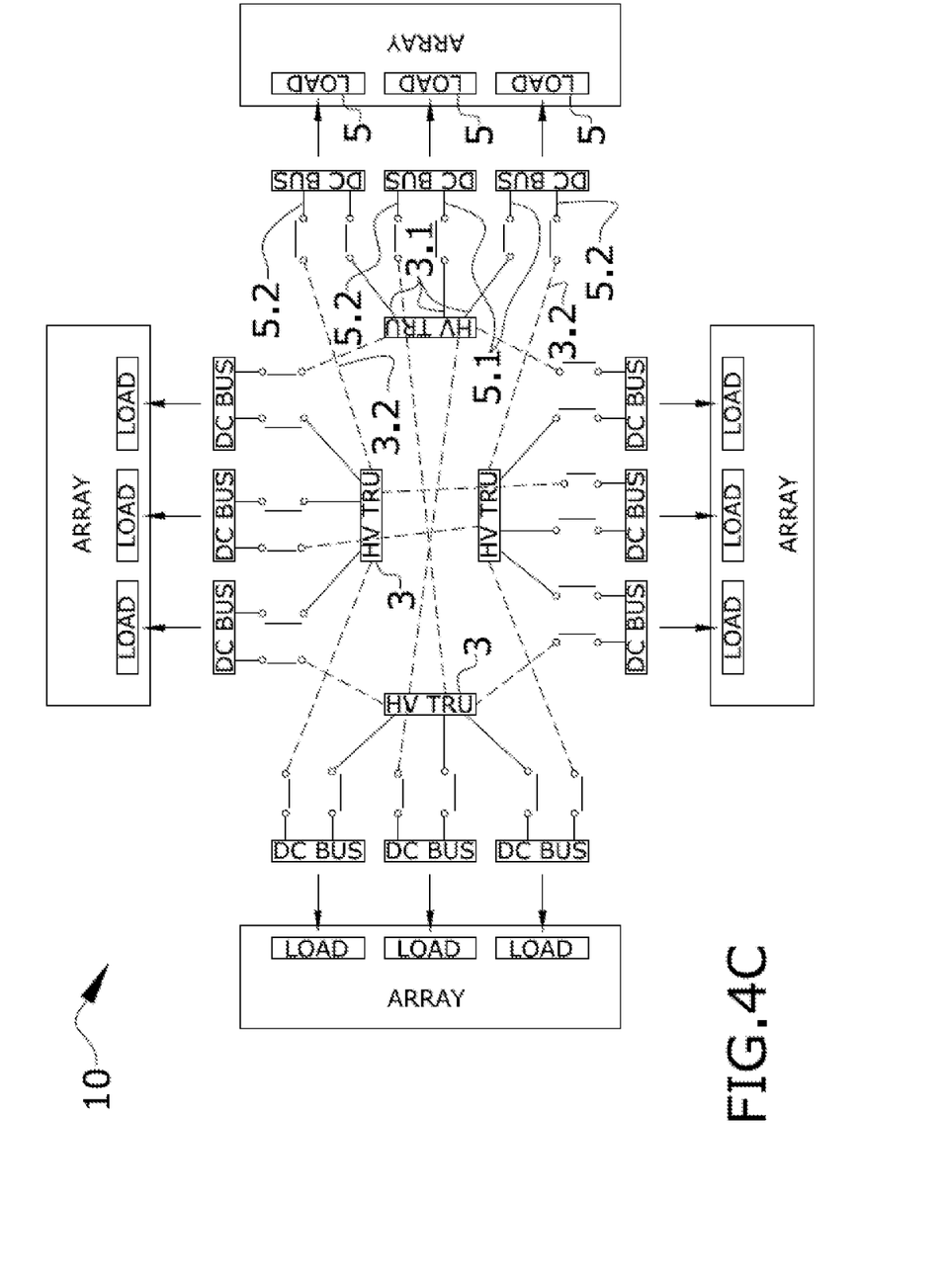
FIG. 4c shows a schematic power distribution system for a radar antenna according to the invention comprising all the possible variants in connections.

FIG. 4c shows schematically all the possible variants in connections of the additional output (3.2) of the AC/DC converters (3) to the electrical loads corresponding to other AC/DC converter (3). Therefore, any AC/DC converters (3) is able to support, feed or energize (understood as equivalent terms) an electrical load (5) corresponding to other AC/DC converter (3).

For illustrative purposes, only a limit number of references have been shown in the figures. Nevertheless, it can be easily deduced which reference corresponds to the features shown in the figures.

Method for continuing supplying electrical power

Figure 5:
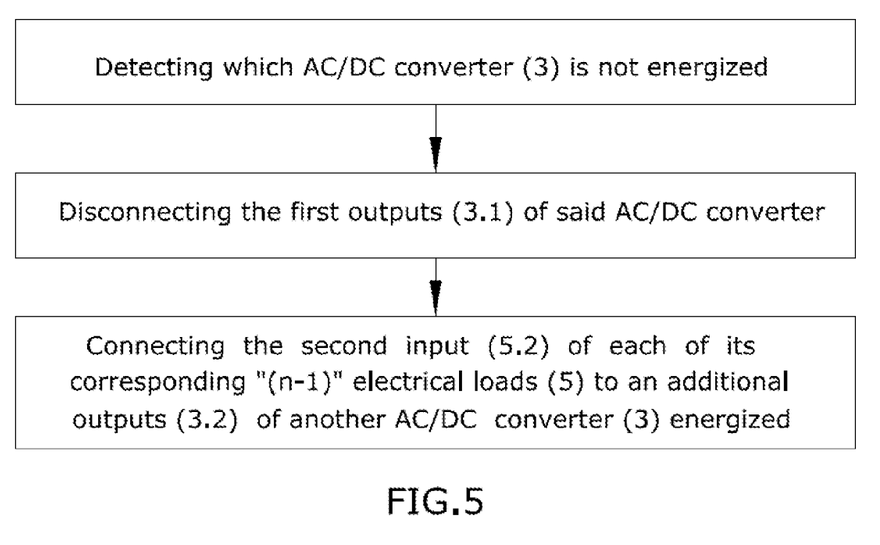
FIG. 5 shows a flowchart of the method for continuing supplying electrical power in a power distribution system in a degraded mode according to the invention.

FIG. 5 shows a flowchart of the method for continuing supplying electrical power in a power distribution system (10) according to the invention. In short, the power distribution system (10) has baseline architecture as that shown in FIG. 3, and once the system switches to a degraded mode, the method comprises the following steps:

detecting which AC/DC converter (3) is not energized, disconnecting the first outputs (3.1) of the AC/DC converter (3) not energized; and connecting the second input (5.2) of each of its corresponding "(n−1)" electrical loads (5) to an additional output (3.2) of another AC/DC converter (3) energized.

Aircraft comprising a power distribution system

Figure 6:
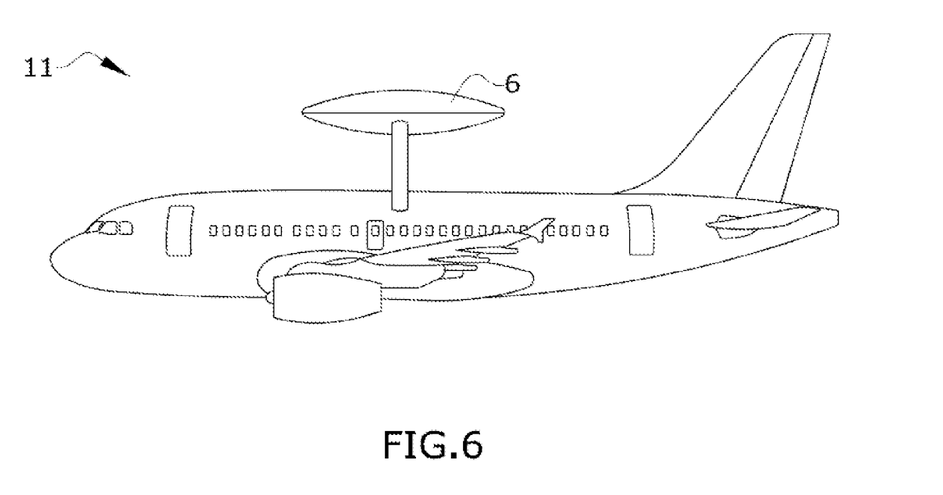
FIG. 6 shows a schematic view of an aircraft comprising a power distribution system according to the invention.

FIG. 6 show a schematic view of an aircraft comprising a power distribution system (10) for DC network, such as a radar antenna (6), according to the invention. As it can be seen, the radar antenna (6) comprising the plurality of electrical loads (5) gathered in arrays (4) is housed in a weatherproof dome in the top of the aircraft (11).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical architecture, being boarded on an aircraft, comprising:

a power distribution system; and a Direct Current, DC, network comprising a radar antenna;

wherein the DC network comprises a plurality of electrical loads, and wherein the power distribution system comprises:

a plurality of AC/DC converters configured to supply electrical power to the DC network, and at least one Alternating Current (AC) power source configured to energize the plurality of AC/DC converters, wherein the power distribution system further comprises:

an "n" number of AC/DC converters, each comprising an "(n−1)" number of first outputs and at least an additional output, wherein the DC network further comprises:

an "(n−1)·n" number of electrical loads, each "(n−1)" electrical load corresponding to one AC/DC converter, wherein each electrical load comprises two inputs:

a first input configured to be connected with a corresponding first output of the corresponding AC/DC converter, and a second input configured to be connected with any of the additional outputs of the AC/DC converters, wherein the power distribution system further comprises a controller configured to continue supplying electrical power to the DC network in case of an AC/DC converter being not energized and therefore not supplying electrical power to its corresponding "(n−1)" electrical loads, such that the second input of such electrical load is connected to any additional output of another energized AC/DC converter, and the first input of such electrical load disconnected.

2. The electrical architecture according to claim 1, wherein the at least one AC power source comprises two reciprocating engines, comprising two diesel engines, each one energizing two 115V or 230 VAC generators which are each configured to further energize an AC/DC converter.

3. The electrical architecture according to claim 1, wherein the at least one AC power source comprises four reciprocating engines, preferably four diesel engines, each energizing a 115 VAC or 230 VAC generator which are each configured to further energize an AC/DC converter.

4. The electrical architecture according to claim 1, wherein the "n" number of AC/DC converters is four, the system comprising four AC/DC converters.

5. The electrical architecture according to claim 1, wherein the power distribution system comprises "n" number of AC/DC converters, each one comprising three additional outputs.

6. The electrical architecture according to claim 1, wherein each of the "(n−1)" electrical loads corresponding to one AC/DC converter are connected in an array.

7. The electrical architecture according to claim 6, wherein each array connecting the "(n−1)" electrical loads is supplied:
  with 87.5 kW if all the AC/DC converters are energized; or
  with 65 kW if any of the AC/DC converters is not energized.

8. The electrical architecture according to claim 1, wherein the "(n−1)·n" electrical loads are configured to operate at least at 270V Direct Current.

9. The electrical architecture according to claim 1, further comprising, switching means for switching connections in case of an AC/DC converter is not energized, and
an electronic controller configured to activate/deactivate the switching means.

10. The electrical architecture according to claim 1, wherein the DC network, such as a radar antenna, comprising a plurality of electrical loads is housed in a weatherproof dome in the top of the aircraft.

11. A method for continuing supplying electrical power in an electrical architecture, being boarded on an aircraft, the electrical architecture comprising:
  a power distribution system; and
  a DC network;
  wherein the DC network comprises a plurality of electrical loads, and
  wherein the power distribution system comprises:
  a plurality of AC/DC converters configured to supply electrical power to the DC network, and
  at least one Alternating Current power source configured to energize the plurality of AC/DC converters,
  wherein the power distribution system further comprises,
    an "n" number of AC/DC converters, each one comprising an "(n−1)" number of first outputs and at least an additional output,
  the DC network further comprises:
    an "(n−1)·n" number of electrical loads, each "(n−1)" electrical loads corresponding to one AC/DC converter, wherein each electrical load comprises two inputs:
      a first input connected with a corresponding first output of the corresponding AC/DC converter, and
      a second input configured to be connected with any of the additional outputs of the AC/DC converters,
  wherein when one of the AC/DC converters is not energized, the method comprises the steps of:
    disconnecting the first outputs of the AC/DC converter not energized, being its corresponding "(n−1)" electrical load not energized thereby; and
    connecting the second input of each of the corresponding "(n−1)" electrical loads to an additional output of another AC/DC converter energized.

12. The method according to claim 11, wherein the DC network comprises a radar antenna.

13. An aircraft comprising the electrical architecture according to claim 1.

* * * * *